(12) United States Patent
Nimura et al.

(10) Patent No.: US 10,141,800 B2
(45) Date of Patent: Nov. 27, 2018

(54) MAGNET-EMBEDDED ROTOR, METHOD FOR MANUFACTURING MAGNET-EMBEDDED ROTOR, AND ORIENTATION AND MAGNETIZATION DEVICE

(71) Applicant: JTEKT CORPORATION, Osaka-shi, Osaka (JP)

(72) Inventors: Keita Nimura, Okazaki (JP); Naotake Kanda, Okazaki (JP); Ryosuke Yamaguchi, Kariya (JP)

(73) Assignee: JTEKT CORPORATION, Osaka (JP)

( * ) Notice: Subject to any disclaimer, the term of this patent is extended or adjusted under 35 U.S.C. 154(b) by 669 days.

(21) Appl. No.: 14/219,270

(22) Filed: Mar. 19, 2014

(65) Prior Publication Data

US 2014/0285049 A1 Sep. 25, 2014

(30) Foreign Application Priority Data

Mar. 21, 2013 (JP) ................................. 2013-058085
Jan. 17, 2014 (JP) ................................. 2014-006890

(51) Int. Cl.
| | | |
|---|---|---|
| H02K 1/27 | (2006.01) | |
| H02K 1/28 | (2006.01) | |
| H02K 15/03 | (2006.01) | |

(52) U.S. Cl.
CPC .............. H02K 1/27 (2013.01); H02K 1/276 (2013.01); H02K 1/2766 (2013.01); H02K 1/28 (2013.01); H02K 15/03 (2013.01)

(58) Field of Classification Search
CPC ........ H02K 1/27; H02K 1/276; H02K 1/2766; H02K 15/03; H02K 1/22; H02K 1/28; H02K 1/2773; H02K 1/30

(Continued)

(56) References Cited

U.S. PATENT DOCUMENTS 2,501,232 A * 3/1950 Mesh ...................... H02K 1/30
  310/269
4,703,210 A   10/1987 Abukawa et al.
(Continued)

FOREIGN PATENT DOCUMENTS

CN   102971943 A    3/2013
DE   102007024406 A1 * 11/2008   ........... H02K 1/2773
(Continued)

OTHER PUBLICATIONS

JP 2001061245 A (English Translation).*

(Continued)

*Primary Examiner* — Joshua Benitez Rosario
*Assistant Examiner* — Alexander Moraza
(74) *Attorney, Agent, or Firm* — Oliff PLC

(57) ABSTRACT

A magnet-embedded rotor includes a cylindrical rotor core that rotates together with a rotating shaft; and permanent magnets embedded in the rotor core. The rotor core includes core members, and each core member includes a tubular portion into which the rotating shaft is inserted and projecting portions formed to project in a radial direction of the tubular portion from an outer periphery of the tubular portion and arranged apart from each other in a circumferential direction of the tubular portion. The rotor core is formed by assembling the core members such that the tubular portions are arranged on one straight line and the projecting portion of the core member and the projecting portion of the other core member are adjacent to each other in a circumferential direction of the rotor core. The permanent magnet is embedded in each projecting portion of each core member.

5 Claims, 12 Drawing Sheets

(58) Field of Classification Search
USPC ........ 310/156.53, 156.56, 216.015, 216.016, 310/216.017, 216.044, 216.025, 216.031, 310/156.66–73, 216.008
See application file for complete search history.

(56) References Cited

U.S. PATENT DOCUMENTS

| | | | | |
|---|---|---|---|---|
| 5,162,686 | A * | 11/1992 | Royer | H02K 1/2773 310/156.59 |
| 5,684,352 | A * | 11/1997 | Mita | H02K 1/02 310/152 |
| 5,786,650 | A * | 7/1998 | Uchida | H02K 1/2773 310/156.55 |
| 5,829,120 | A * | 11/1998 | Uchida | H02K 1/2773 29/598 |
| 5,864,191 | A * | 1/1999 | Nagate | H02K 1/276 310/156.53 |
| 6,144,132 | A * | 11/2000 | Nashiki | H02K 1/2713 310/152 |
| 2003/0214194 | A1* | 11/2003 | Carl, Jr. | H02K 1/2766 310/156.08 |
| 2004/0113511 | A1* | 6/2004 | Schmidt | H02K 1/148 310/216.061 |
| 2009/0261677 | A1 | 10/2009 | Ishikawa et al. | |
| 2012/0181895 | A1* | 7/2012 | Pan | H02K 1/2773 310/261.1 |
| 2013/0207507 | A1* | 8/2013 | Han | H02K 15/03 310/216.007 |
| 2013/0234555 | A1* | 9/2013 | Takizawa | H02K 1/2773 310/156.15 |
| 2013/0300242 | A1 | 11/2013 | Yamada et al. | |
| 2014/0102674 | A1* | 4/2014 | Manz | H02K 1/2773 165/121 |
| 2015/0028710 | A1* | 1/2015 | Oka | H02K 1/2773 310/156.48 |

FOREIGN PATENT DOCUMENTS

| | | | | |
|---|---|---|---|---|
| DE | 102010023878 | A1 * | 12/2011 | ............ H02K 1/276 |
| JP | S62-068051 | A | 3/1987 | |
| JP | H05-168201 | A | 7/1993 | |
| JP | H08-331784 | A | 12/1996 | |
| JP | 2001061245 | A * | 3/2001 | |
| JP | 2004-517597 | A | 6/2004 | |
| JP | 2005-168128 | A | 6/2005 | |
| JP | 2008-301644 | A | 12/2008 | |
| JP | A-2010-193587 | | 9/2010 | |
| JP | 2012-120392 | A | 6/2012 | |
| JP | 2013-198304 | A | 9/2013 | |

OTHER PUBLICATIONS

DE 102007024406 A1 (English Translation).*
DE 102010023878 A1 (English Translation).*
By: Anonymous, "Injection Molded Magnets", Dec. 30, 2012, MMC Magnetic Materials & Components, http://web.archive.org/web/20121230230403/htttp://www.mmcmagnetics.com/ourproducts/Bonded/Injection_Molded.htm.
Jul. 4, 2016 Extended Search Report issued in European Patent Application No. 14160845.5.
Jun. 2, 2017 Office Action issued in Chinese Patent Application No. 201410108646.1.
Dec. 27, 2017 Office Action issued in Chinese Patent Application No. 201410108646.1.
Aug. 29, 2017 Office Action issued in Japanese Patent Application No. 2014-006890.
Mar. 13, 2018 Office Action issued in Japanese Patent Application No. 2014-006890.

* cited by examiner

MAGNET-EMBEDDED ROTOR, METHOD FOR MANUFACTURING MAGNET-EMBEDDED ROTOR, AND ORIENTATION AND MAGNETIZATION DEVICE

INCORPORATION BY REFERENCE

The disclosure of Japanese Patent Application No. 2013-058085 and 2014-006890 filed on Mar. 21, 2013 and Jan. 17, 2014 including the specification, drawings and abstract is incorporated herein by reference in its entirety.

BACKGROUND OF THE INVENTION

1. Field of the Invention

The invention relates to a magnet-embedded rotor, a method for manufacturing a magnet-embedded rotor, and an orientation and magnetization device.

2. Description of Related Art

Interior permanent magnet motors (IPM motors) having a structure in which a permanent magnet for a field is embedded in a rotor are known. A method described in Japanese Patent Application Publication No. 2010-193587 (JP 2010-193587 A) is an example of known methods for manufacturing a magnet-embedded rotor used in the IPM motor. In JP 2010-193587 A, a magnet material prior to magnetization is embedded in a magnet insertion hole that is formed in a cylindrical rotor core, and then a magnetization device is arranged to cover an outer periphery of the rotor core. A magnetic flux is supplied into the rotor core from an outer peripheral surface of the rotor core by the magnetization device such that the magnet material embedded in the rotor core is magnetized to become the permanent magnet.

In a case where the magnetic flux is supplied from the outer peripheral surface of the rotor core by the magnetization device as described in JP 2010-193587 A, the quantity of the magnetic flux that can be supplied to the magnet material prior to magnetization embedded in the rotor core is determined by a surface area of the outer peripheral surface of the rotor core and the quantity of the magnetic flux per unit area that can be supplied from the magnetization device. The quantity of the magnetic flux per unit area that can be supplied from the magnetization device is limited. Accordingly, in a case where an area of the outer peripheral surface of the rotor core receiving the supply of the magnetic flux from the magnetization device is small with respect to an area of a magnetization surface of the magnet material, magnetization of a magnetic steel sheet at the site is saturated and it becomes difficult to supply a sufficient magnetic flux to the magnet material, which results in a decrease in the magnetization rate of the permanent magnet. When the magnetization rate of the permanent magnet is decreased, a sufficient magnetic flux is not generated from the permanent magnet, and a magnetic flux density at the outer peripheral surface of the rotor is decreased. This decreases the effective quantity of magnetic flux interlinked to a stator coil, and decreases an output torque of the motor.

SUMMARY OF THE INVENTION

The invention provides a magnet-embedded rotor, a method for manufacturing a magnet-embedded rotor, and an orientation and magnetization device, which make it possible to improve a magnetization rate of a permanent magnet.

A magnet-embedded rotor according to an aspect of the invention includes a cylindrical rotor core that rotates together with a rotating shaft; and permanent magnets embedded in the rotor core, wherein the rotor core includes a plurality of core members, and each of the plurality of core members includes a tubular portion into which the rotating shaft is inserted and a plurality of projecting portions formed to project in a radial direction of the tubular portion from an outer periphery of the tubular portion and arranged apart from each other in a circumferential direction of the tubular portion, wherein the rotor core is formed by assembling the plurality of core members such that the tubular portions of the plurality of core members are arranged on one straight line and each of the plurality of projecting portions of each of the plurality of core members is adjacent to the projecting portion of the other core member in a circumferential direction of the rotor core, and wherein the permanent magnet is embedded in each of the plurality of projecting portions of each of the plurality of core members.

A method for manufacturing the magnet-embedded rotor according to the above-mentioned aspect includes a magnetization process in which a magnet material prior to magnetization embedded in each of the plurality of projecting portions of each of the plurality of core members is magnetized to produce the permanent magnet; and a process in which the plurality of core members are assembled in an axial direction of the rotor core, after the magnetization process is performed.

According to the configuration and the manufacturing method described above, an orientation and magnetization device can be arranged in a gap formed between the projecting portions of the core member. Thus, the orientation and magnetization device can be arranged to face not only the side surface of the projecting portion constituting the outer peripheral surface of the rotor core but also the side surface of the projecting portion in the circumferential direction of the rotor core. Accordingly, as compared to a case of the related art where the magnetic flux flows in and out only via an outer peripheral surface of a rotor core, a surface area of a part through which the magnetic flux flows in and out can be increased, and thus the quantity of the magnetic flux that is supplied to the permanent magnet can be increased. Thus, a magnetization rate of the permanent magnet embedded in the projecting portion can be improved. As a result, the magnetization rate of the permanent magnets of the entire rotor can be improved.

In the magnet-embedded rotor according to the above-mentioned aspect, the permanent magnet forming one magnetic pole at an outer peripheral part of the rotor core may be embedded in each of the projecting portions. According to the configuration, the magnetic pole of the rotor can be formed with ease.

In the magnet-embedded rotor according to the above-mentioned aspect, the permanent magnet embedded in the projecting portion of the core member may be arranged to face the permanent magnet embedded in the projecting portion of the other core member adjacent to the core member in the circumferential direction of the rotor core so that magnetic poles having a same polarity face each other; and one magnetic pole may be formed at an outer peripheral part of the rotor core by a set of the permanent magnets that are arranged to face each other so that the magnet poles having the same polarity face each other.

According to the configuration, a boundary part of the projecting portions of the core members is positioned between a set of the permanent magnets that face each other so that the poles with the same polarity face each other. The magnetic fields formed by the permanent magnets repel each other between the set of the permanent magnets that face each other so that the poles having the same polarity face each other, and thus magnetic flux exchange does not occur therebetween. Accordingly, the magnetic flux that passes through the boundary part of the projecting portions of the core members adjacent to each other can be decreased. Therefore, the boundary part of the projecting portions is unlikely to act as a magnetoresistance against the magnetic paths formed by the set of permanent magnets, and thus a reduction in magnetic flux density at the outer peripheral surface of the rotor core can be suppressed. As a result, the output torque of the motor can be ensured.

In a case where the rotor core is formed of two core members, the rotor core is completed by just assembling the two core members, and thus the manufacturing of the rotor core is facilitated. However, as the number of magnetic poles of the rotor increases, the number of permanent magnets for forming the magnetic poles increases. Therefore, the number of projecting portions formed in one core member is inevitably increased. When the number of projecting portions formed in one core member increases, the gap between the projecting portions is narrowed, and thus it is difficult to arrange the orientation and magnetization device between the projecting portions.

In the magnet-embedded rotor according to the above-mentioned aspect, the number of the plurality of core members assembled to form the rotor core may be three or more. According to the configuration, the number of projecting portions formed in one core member is small as compared to a case where the rotor core is formed of two core members, and thus the gap between the projecting portions can be widened. As such, the orientation and magnetization device can be arranged between the projecting portions with ease.

In addition, in the magnet-embedded rotor according to the above-mentioned aspect, the plurality of core members may have a same shape except for a magnetic pole arrangement of each of the permanent magnets. According to the configuration, the same manufacturing processes can be employed except for the magnetization process during the manufacturing of each of the core members. Therefore, manufacturing man-hours for the core members can be reduced, and thus manufacturing costs can be reduced for the rotor.

An orientation and magnetization device that performs at least one of orientation and magnetization on a magnet material prior to magnetization embedded in each of the plurality of core members may include a magnetic path forming unit that is arranged to face an outer peripheral side surface and a circumferential direction side surface of each of the plurality of projecting portions, and forms a magnetic path extending through the magnet material prior to magnetization embedded in the projecting portion, the outer peripheral side surface being a side surface constituting an outer peripheral part of the rotor core, and the circumferential direction side surface being a side surface facing the other projecting portion in the circumferential direction of the rotor core.

In the orientation and magnetization device, the magnetic path forming unit may be configured to include a magnetizing yoke arranged to face the outer peripheral side surface and the circumferential direction side surface of the projecting portion, and a magnetic flux generating unit adjacent to the magnetizing yoke.

According to the configuration, the magnetic flux generated by the magnetic flux generating unit can be collected by the magnetizing yoke and supplied to the projecting portion, and thus the quantity of the magnetic flux supplied to the projecting portion can be increased as compared to a case where the magnetic flux generating unit directly faces the outer peripheral side surface and the circumferential direction side surface of the projecting portion. Accordingly, at least one of an orientation rate and a magnetization rate of the permanent magnet that is embedded in the projecting portion can be increased.

According to the magnet-embedded rotor, the method for manufacturing a magnet-embedded rotor, and the orientation and magnetization device, the magnetization rate of the permanent magnet can be improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Hereinafter, a magnet-embedded rotor according to a first embodiment will be described. Firstly, a structure of an IPM motor that uses the magnet-embedded rotor according to the present embodiment will be described.

Figure 1:
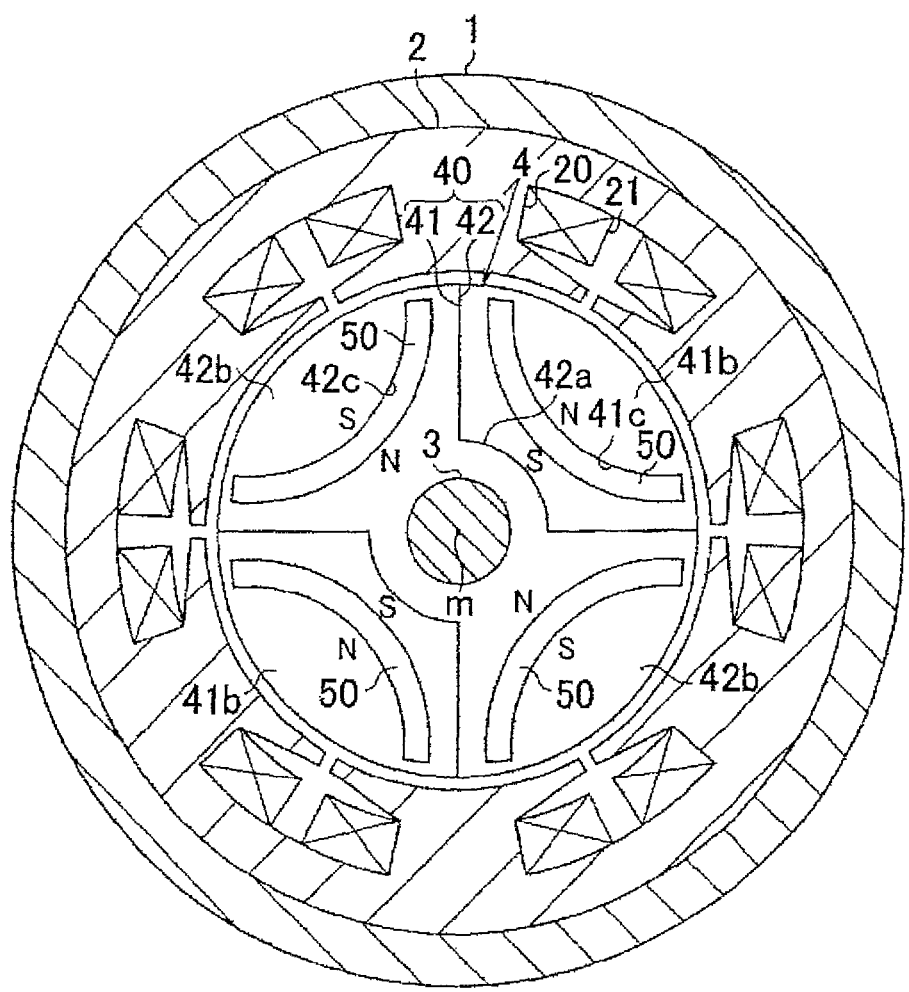
FIG. 1 is a cross-sectional view illustrating a cross-sectional structure of an IPM motor using a magnet-embedded rotor according to a first embodiment.

As illustrated in FIG. 1, the IPM motor includes a stator 2 that is fixed to an inner peripheral surface of a housing 1, a motor shaft 3 as a rotating shaft that is supported so as to be rotatable around an axis m, by the housing 1 via a bearing (not illustrated), and a rotor 4 that is integrally fitted to an outer periphery of the motor shaft 3 and is arranged inside the stator 2.

The stator 2 is formed to be cylindrical around the axis m. The stator 2 has a structure in which a plurality of magnetic steel sheets are stacked in an axial direction of the stator 2. Six teeth 20 that extend toward a radial direction inner side are formed on an inner peripheral surface of the stator 2. A stator coil 21 is wound around each of the teeth 20.

Figure 2:
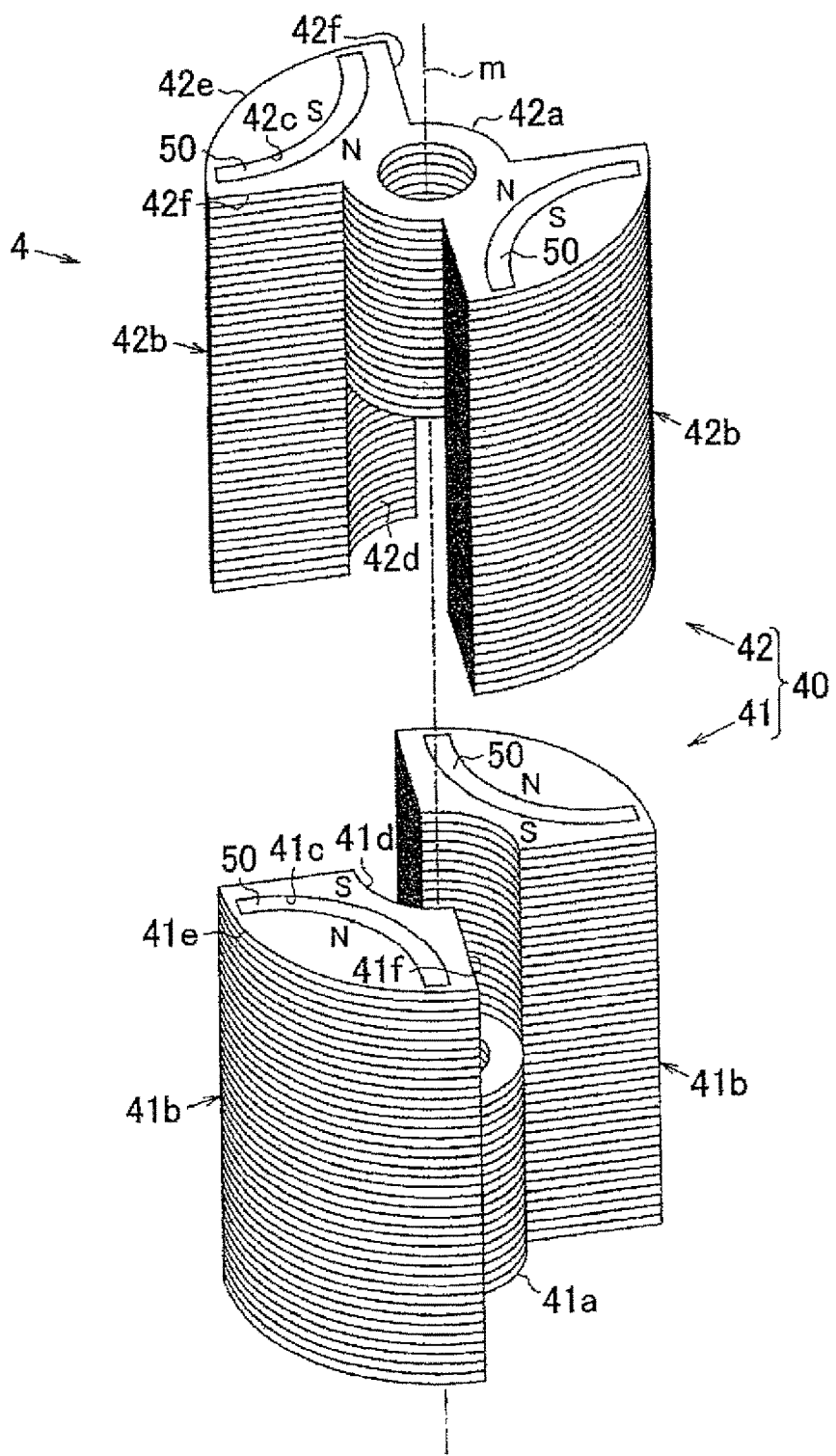
FIG. 2 is a perspective view illustrating an exploded perspective structure of the magnet-embedded rotor according to the first embodiment.

The rotor 4 has a rotor core 40 that is formed to be cylindrical around the axis m, and four permanent magnets 50 that are embedded in the rotor core 40. As illustrated in FIG. 2, the rotor core 40 is formed by assembling paired core members 41, 42 in an axial direction (direction parallel to the axis m) of the rotor core 40. Each of the core members 41, 42 has a structure in which a plurality of magnetic steel sheets are stacked in the rotor core axial direction.

Figure 3:
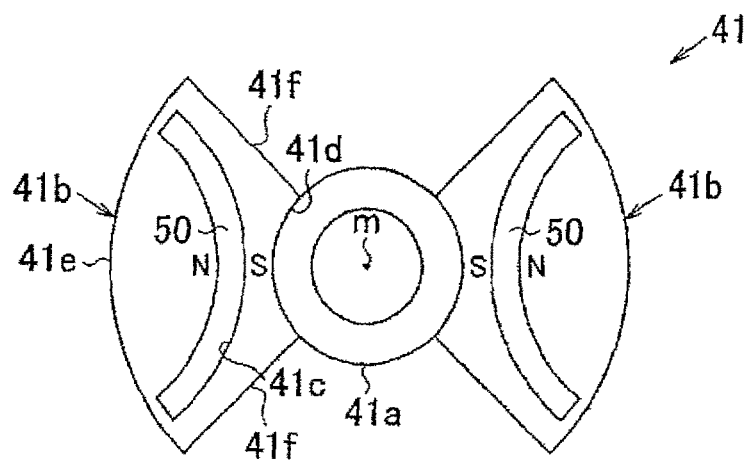
FIG. 3 is a plan view illustrating a planar structure of a core member of the magnet-embedded rotor according to the first embodiment.
Figure 4:
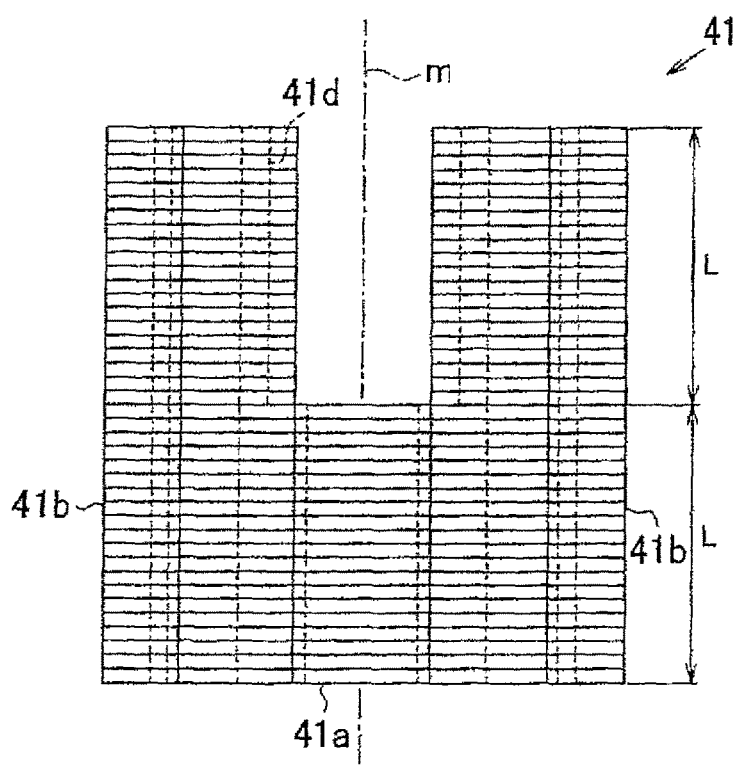
FIG. 4 is a front view illustrating a front structure of the core member of the magnet-embedded rotor according to the first embodiment.

As illustrated in FIGS. 3 and 4, a tubular portion 41a that has a tubular shape around the axis m, and paired projecting portions 41b that project in a radial direction thereof from an outer periphery of the tubular portion 41a are formed in the first core member 41. Hereinafter, the radial direction of the tubular portion 41a (direction orthogonal to the axis m) is referred to as a "tubular portion radial direction," an axial direction of the tubular portion 41a (direction parallel to the axis m) is referred to as a "tubular portion axial direction," and a circumferential direction of the tubular portion 41a (circumferential direction around the axis m) is referred to as a "tubular portion circumferential direction." The motor shaft 3 is inserted into the tubular portion 41a. The paired projecting portions 41b are symmetrically arranged about the tubular portion 41a. A cross-sectional shape of each of the projecting portions 41b that is orthogonal to the tubular portion axial direction is a substantially fan shape with a central angle of 45°. As illustrated in FIG. 4, one end surfaces of the tubular portion 41a and both of the projecting portions 41b in the tubular portion axial direction are arranged on one plane, a length of each of the projecting portions 41b in the tubular portion axial direction is twice an axial direction length L of the tubular portion 41a. Accordingly, the tubular portion 41a is arranged to be adjacent to, and surrounded by the projecting portions 41b, in an area from one end surface of each of the projecting portions 41b to a middle portion of each of the projecting portions 41b in the tubular portion axial direction. In addition, an insertion portion 41d that is a space surrounded by the projecting portions 41b is formed in an area from the middle portion of each of the projecting portions 41b in the axial direction to the other end surface of each of the projecting portions 41b. The insertion portion 41d is a space into which a tubular portion of the other core member is inserted. Hereinafter, as illustrated in FIG. 3, a substantially fan-shaped arc part of a side surface of the projecting portion 41b that constitutes an outer peripheral surface of the rotor core 40 is referred to as an outer peripheral side surface 41e, and both side surfaces that face the other projecting portions 41b in a rotor core circumferential direction are referred to as circumferential direction side surfaces 41f.

As illustrated in FIG. 3, a magnet insertion hole 41c is formed in each of the projecting portions 41b to extend through the projecting portion 41b in the tubular portion axial direction. A cross-sectional shape of the magnet insertion hole 41c that is orthogonal to the tubular portion axial direction is a U shape which is open toward an outer peripheral side. The permanent magnet 50, whose cross-sectional shape that is orthogonal to the tubular portion axial direction is a U shape, is inserted into the magnet insertion hole 41c. The permanent magnet 50 is formed of a bond magnet, and has an N pole inside the U shape and an S pole outside the U shape. An N pole is formed on the outer peripheral side surface 41e of each of the projecting portions 41b by the permanent magnet 50.

As illustrated in FIG. 2, a second core member 42 has a shape similar to that of the first core member 41, except that each of the permanent magnets 50 of the second core member 42 has a reverse magnetic pole arrangement. In other words, the permanent magnet 50 of the second core member 42 has an S pole inside the U shape and an N pole outside the U shape. An S pole is formed on an outer peripheral side surface 42e of each of projecting portions 42b by the permanent magnet 50. In addition, in FIG. 2, a tubular portion of the second core member 42 is indicated by reference numeral 42a, a magnet insertion hole is indicated by reference numeral 42c, an insertion portion is indicated by reference numeral 42d, and a circumferential direction side surface of each of the projecting portions 42b is indicated by reference numeral 42f.

The paired core members 41, 42 are assembled in such a manner that the tubular portions 41a, 42a are inserted into the insertion portions 42d, 41d, respectively, and each of the projecting portions 41b of the first core member 41 is adjacent to the projecting portions 42b of the second core member 42 in the circumferential direction of the rotor core 40. In this case, the tubular portion 41a of the first core member 41 and the tubular portion 42a of the second core member 42 are adjacent to each other in the axial direction of the rotor core 40 and are arranged on one straight line. The paired core members 41, 42, which are assembled in this manner, constitute the rotor 4. In this manner, the rotor 4 has a four-pole structure in which the N poles and S poles are alternately disposed along an outer peripheral part of the rotor 4.

A rotating magnetic field is formed in the IPM motor having the above configuration when an alternating current is supplied to the stator coil 21 illustrated in FIG. 1. The rotating magnetic field and a magnetic field that is formed by the permanent magnet 50 act so that torque is applied to the rotor 4 and the motor shaft 3 is rotated.

Figure 5:
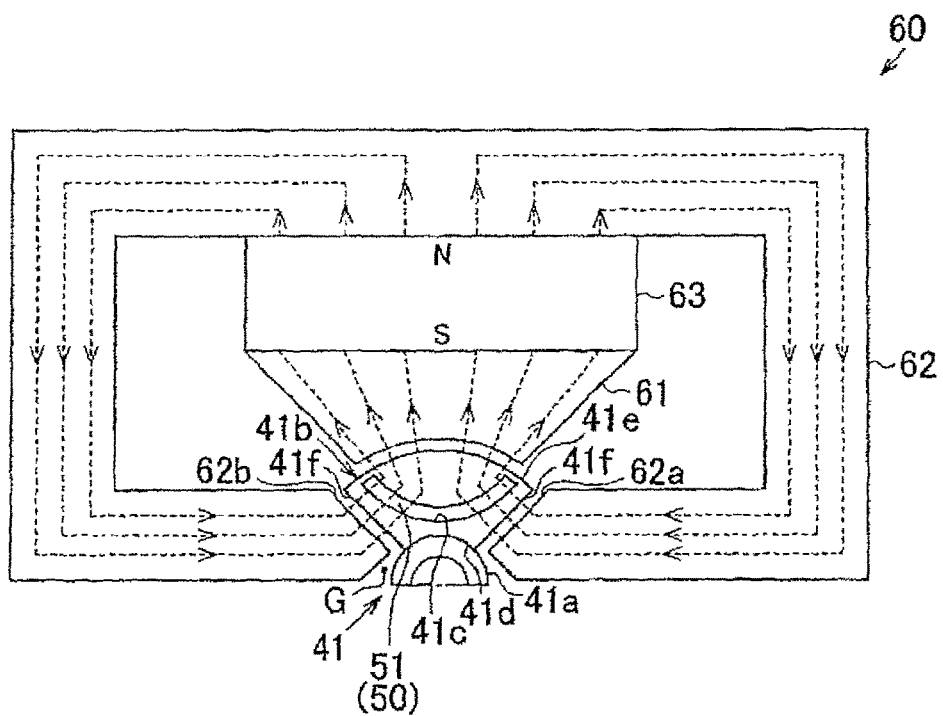
FIG. 5 is a plan view illustrating a method for magnetizing the core member of the magnet-embedded rotor according to the first embodiment.

Next, a method for manufacturing the rotor 4 and effects thereof will be described. Firstly, during the manufacturing of the rotor 4, the first core member 41 illustrated in FIGS. 3 and 4 is formed by stacking magnetic steel sheets. Then, a magnet material prior to magnetization is embedded in each magnet insertion hole 41c of the molded first core member 41 by injection molding or the like, and then orientation and magnetization are performed on the magnet material by using an orientation and magnetization device 60 illustrated in FIG. 5. In FIG. 5, the magnet material prior to magnetization is indicated by reference numeral 51.

As illustrated in FIG. 5, the orientation and magnetization device 60 includes a first magnetizing yoke 61, a second magnetizing yoke 62, and a permanent magnet 63. The first magnetizing yoke 61 is arranged to face the outer peripheral side surface 41e of the projecting portion 41b. The second magnetizing yoke 62 is formed into a C shape such that a part of an annular shape is cut off by forming a space G into which the first core member 41 is inserted. The first magnetizing yoke 61 and the permanent magnet 63 are arranged inside the second magnetizing yoke 62. An S pole of the permanent magnet 63 is adjacent to an outer surface of the first magnetizing yoke 61 on a side opposite to a surface facing the projecting portion 41b. An N pole of the permanent magnet 63 is adjacent to an annular inner peripheral surface of the second magnetizing yoke 62. Both end portions 62a, 62b of the second magnetizing yoke 62 that face each other across the space G are inserted into gaps formed between the paired projecting portions 41b, 41b of the first core member 41, and respectively face the circumferential direction side surfaces 41f, 41f of the projecting portion 41b.

Magnetic paths are formed in the orientation and magnetization device 60 as indicated by dashed-line arrows in the drawing. In other words, the magnetic paths are formed so as to be directed from the outer side of the U shape to the inner side of the U shape with respect to each magnet material 51. Orientation of the magnet material 51 is performed in this manner, and the inner side of the U shape of the magnet material 51 is magnetized to the N pole and the outer side of the U shape is magnetized to the S pole. The magnet material 51 becomes the permanent magnet 50 through the magnetization process, and forming of the first core member 41 is completed. When the second core member 42 is formed, each magnet material prior to magnetization that is embedded in the second core member 42 can be magnetized in a similar manner by using an orientation and magnetization device in which the magnetic pole arrangement of the permanent magnet 63 is reversely set with respect to the orientation and magnetization device 60 illustrated in FIG. 5. The manufacturing of the rotor 4 is completed when the first core member 41 and the second core member 42 are assembled after the completion of the magnetization process.

According to the rotor 4, the method for manufacturing the rotor 4, and the orientation and magnetization device 60 described above, the following advantageous effects described in (1) to (3) can be achieved. (1) According to the method for manufacturing the rotor 4 illustrated in FIG. 5, the first magnetizing yoke 61 can be arranged to be adjacent to the outer peripheral side surface 41e of the projecting portion 41b of the first core member 41, and the second magnetizing yoke 62 can be arranged to be adjacent to the circumferential direction side surfaces 41f of the projecting portion 41b. In this manner, a magnetic flux can be caused to flow in from the circumferential direction side surfaces 41f of the projecting portion 41b, and the magnetic flux can be caused to flow out from the outer peripheral side surface 41e of the projecting portion 41b. Accordingly, as compared to a case of the related art where the magnetic flux flows in and out only via an outer peripheral surface of a rotor core, a surface area of a part through which the magnetic flux flows in and out can be increased, and thus the quantity of the magnetic flux that is supplied to the magnet material 51 prior to magnetization can be increased. In this manner, an orientation rate and a magnetization rate of the permanent magnet 50 that is embedded in the projecting portion 41b are improved. In addition, a similar effect can be achieved by the second core member 42. As a result, the orientation rate and the magnetization rate of the permanent magnets 50 of the entire rotor 4 are improved, and therefore, the effective quantity of magnetic flux interlinked to the stator coil 21 can be increased and an output torque of the motor can be improved as well.

(2) The permanent magnet 50 that forms one magnetic pole at the outer peripheral part of the rotor core 40 is embedded in each of the projecting portions 41b, 42b of the core members 41, 42. In this manner, the magnetic pole of the rotor core 40 can be formed with ease.

(3) The paired core members 41, 42 have the same shape except for the magnetic pole arrangement of each of the permanent magnets 50 (that is, the magnetic pole arrangement of each of the permanent magnets 50 of the core member 41 is different from the magnetic pole arrangement of each of the permanent magnets 50 of the core member 42). In this manner, the same manufacturing processes can be employed during the manufacturing of the core members 41, 42 except for the magnetization process. As such, manufacturing man-hours for each of the core members 41, 42 can be reduced, and thus manufacturing costs can be reduced for the rotor 4.

Modification Example

Figure 6:
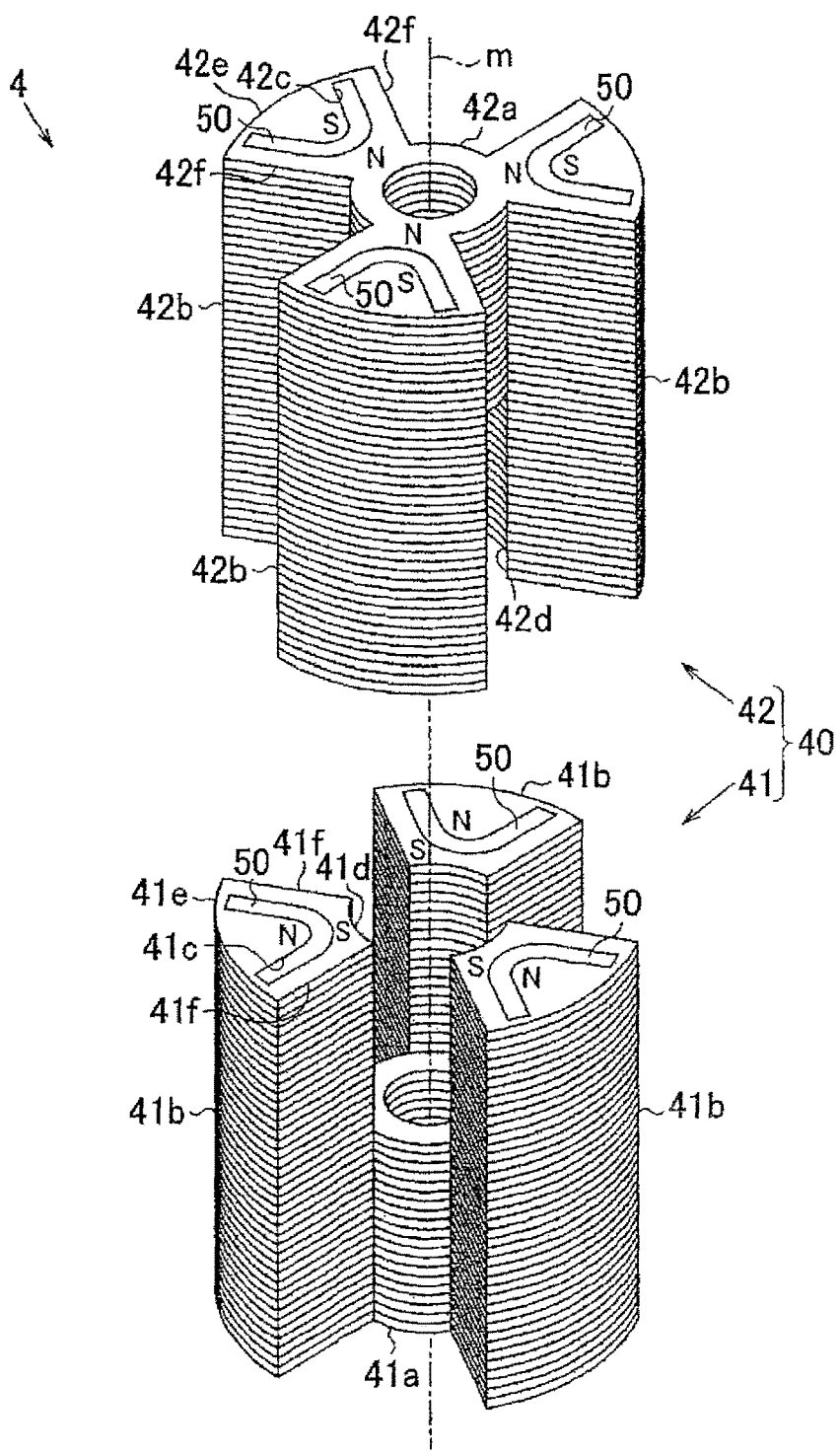
FIG. 6 is a perspective view illustrating an exploded perspective structure of a magnet-embedded rotor according to a modification example of the first embodiment.

Next, a modification example of the magnet-embedded rotor 4 according to the first embodiment will be described. As illustrated in FIG. 6, in this modification example, three substantially fan-shaped projecting portions 41b are formed at equal angular intervals at an outer peripheral part of the tubular portion 41a of the first core member 41. Similarly, three substantially fan-shaped projecting portions 42b are formed at equal angular intervals at an outer peripheral part of the tubular portion 42a of the second core member 42. The rotor 4 that has six magnetic poles can be formed by assembling the first core member 41 and the second core member 42. When the number of projecting portions 41b, 42b of the core members 41, 42 is changed appropriately in this manner, the number of magnetic poles of the rotor 4 can be changed with ease.

Next, a method for manufacturing the rotor 4 illustrated in FIG. 6 will be described. As in the first embodiment, the first core member 41 illustrated in FIG. 6 is formed by stacking magnetic steel sheets first, for manufacturing the rotor 4 according to the present modification example. Then, a magnet material prior to magnetization is embedded by injection molding or the like in the magnet insertion hole 41c of the formed first core member 41, and then orientation and magnetization are performed on the U-shaped magnet material 51 by using an orientation and magnetization device 70 illustrated in FIG. 7.

Figure 7:
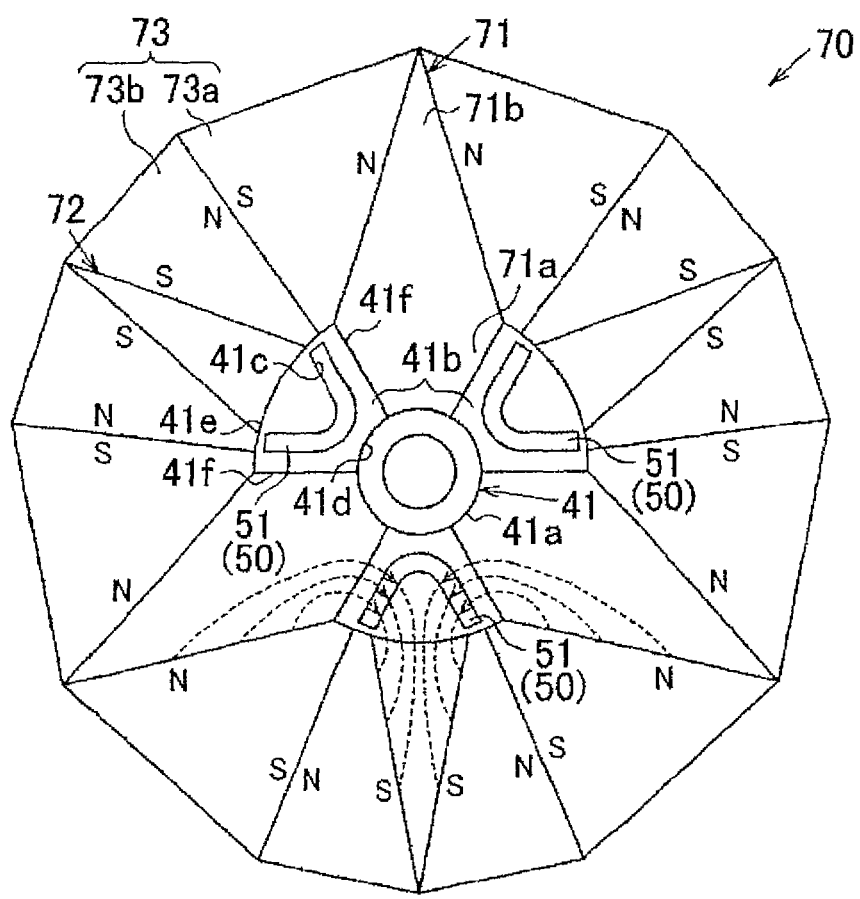
FIG. 7 is a plan view illustrating a method for magnetizing a core member of the magnet-embedded rotor according to the modification example of the first embodiment.

As illustrated in FIG. 7, the orientation and magnetization device 70 includes first magnetizing yokes 71 each of which is arranged between the projecting portions 41b, 41b which are adjacent to each other in the tubular portion circumferential direction, second magnetizing yokes 72 each of which is arranged to face the outer peripheral side surface 41e of the projecting portion 41b, and permanent magnets 73 each of which is arranged between the first magnetizing yoke 71 and the second magnetizing yoke 72.

The first magnetizing yoke 71 includes an inner side part 71a that is arranged to fill a gap between the projecting portions 41b, 41b in the tubular portion circumferential direction, and an outer side part 71b that extends from the inner side part 71a toward a tubular portion radial direction outer side. The outer side part 71b of the first magnetizing yoke 71 is formed to be sharpened toward the tubular portion radial direction outer side. The second magnetizing yoke 72 is arranged to face an area of the outer peripheral side surface 41e of the projecting portion 41b, the area facing an inner peripheral surface of the U-shaped magnet material 51. As is the case with the first magnetizing yoke 71, the second magnetizing yoke 72 is formed to be sharpened toward the tubular portion radial direction outer side from a part facing the outer peripheral side surface 41e of the projecting portion 41b.

The permanent magnet 73 includes a first permanent magnet 73a that is adjacent to the first magnetizing yoke 71, and a second permanent magnet 73b that is adjacent to the second magnetizing yoke 72. The first permanent magnet 73a and the second permanent magnet 73b are adjacent to each other in the tubular portion circumferential direction. A part of the first permanent magnet 73a that is adjacent to the first magnetizing yoke 71 is an N pole, and a part of the first permanent magnet 73a that is adjacent to the second permanent magnet 73b is an S pole. A part of the second permanent magnet 73b that is adjacent to the second magnetizing yoke 72 is an S pole, and a part of the second permanent magnet 73b that is adjacent to the first permanent magnet 73a is an N pole. In this manner, the permanent magnets 73 are arranged in such a manner that the N poles face each other across the first magnetizing yoke 71 and the S poles face each other across the second magnetizing yoke 72.

Magnetic paths that are indicated by dashed-line arrows in FIG. 7 are formed in the orientation and magnetization device 70. For convenience, only the magnetic paths that are formed by one of the projecting portions 41b are illustrated in FIG. 7. As illustrated in FIG. 7, the magnetic paths are formed so as to be directed from the outer side of the U shape to the inner side of the U shape with respect to each magnet material 51. Orientation is performed on the magnet material 51 through the magnetization process, and the inner side of the U shape of the magnet material 51 is magnetized to the N pole and the outer side of the U shape is magnetized to the S pole. The magnet material 51 becomes the permanent magnet 50 through the magnetization process, and forming of the first core member 41 is completed. When the second core member 42 is formed, the magnet material prior to magnetization that is embedded in the second core member 42 can be magnetized in a similar manner by using an orientation and magnetization device in which the magnetic pole arrangement of the first permanent magnet 73a and the second permanent magnet 73b is reversely set with respect to the orientation and magnetization device 70 illustrated in FIG. 7. The manufacturing of the rotor 4 according to the modification example is completed when the first core member 41 and the second core member 42 are assembled after the completion of the magnetization process.

Second Embodiment

Next, a magnet-embedded rotor according to a second embodiment will be described. The following description focuses on differences between the second embodiment and the modification example of the first embodiment.

Figure 8:
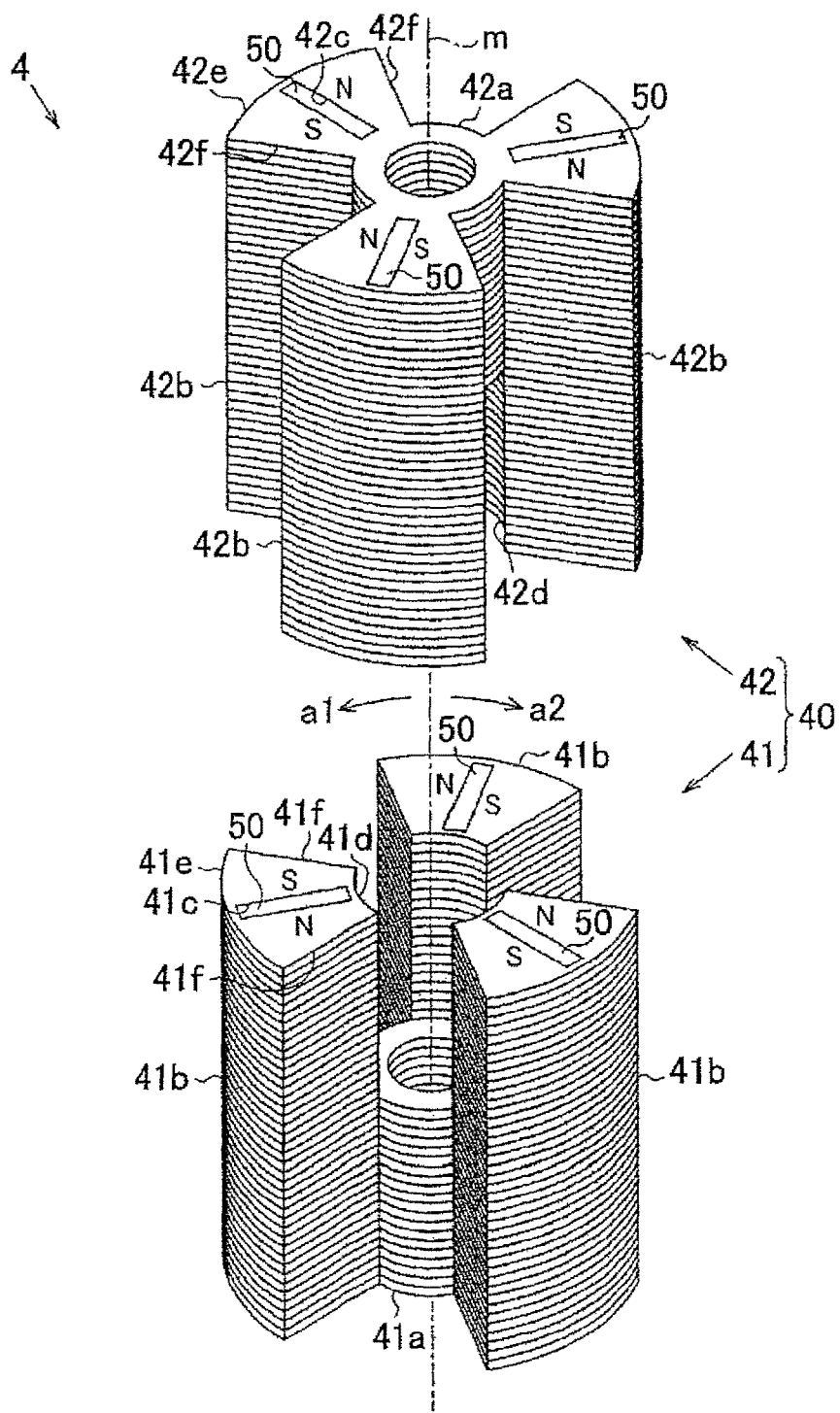
FIG. 8 is a perspective view illustrating an exploded perspective structure of a magnet-embedded rotor according to a second embodiment.

As illustrated in FIG. 8, in the second embodiment, a cross-sectional shape of the magnet insertion hole 41c formed in the projecting portion 41b of the first core member 41 that is orthogonal to the tubular portion axial direction is a rectangular shape extending in the tubular portion radial direction. Similarly, a cross-sectional shape of the magnet insertion hole 42c formed in the projecting portions 42b of the second core member 42 that is orthogonal to the tubular portion axial direction is a rectangular shape extending in the tubular portion radial direction. The permanent magnet 50 whose cross-sectional shape that is orthogonal to the tubular portion axial direction is a rectangular shape is inserted into each of the magnet insertion holes 41c, 42c. Each of the permanent magnets 50 disposed in the first core member 41 has an N pole at a part on one direction a1 side (i.e., on one side) in the tubular portion circumferential direction, and has an S pole at a part on the other direction a2 side (i.e., on the other side) in the tubular portion circumferential direction. In contrast, each of the permanent magnets 50 disposed in the second core member 42 has an S pole at a part on one direction a1 side (i.e., on the one side) in the tubular portion circumferential direction, and has an N pole at a part on the other direction a2 side (i.e., on the other side) in the tubular portion circumferential direction. The second core member 42 according to the embodiment has a structure obtained by turning the first core member 41 upside down. In other words, the first core member 41 and the second core member 42 according to this embodiment have the same structure.

Figure 9:
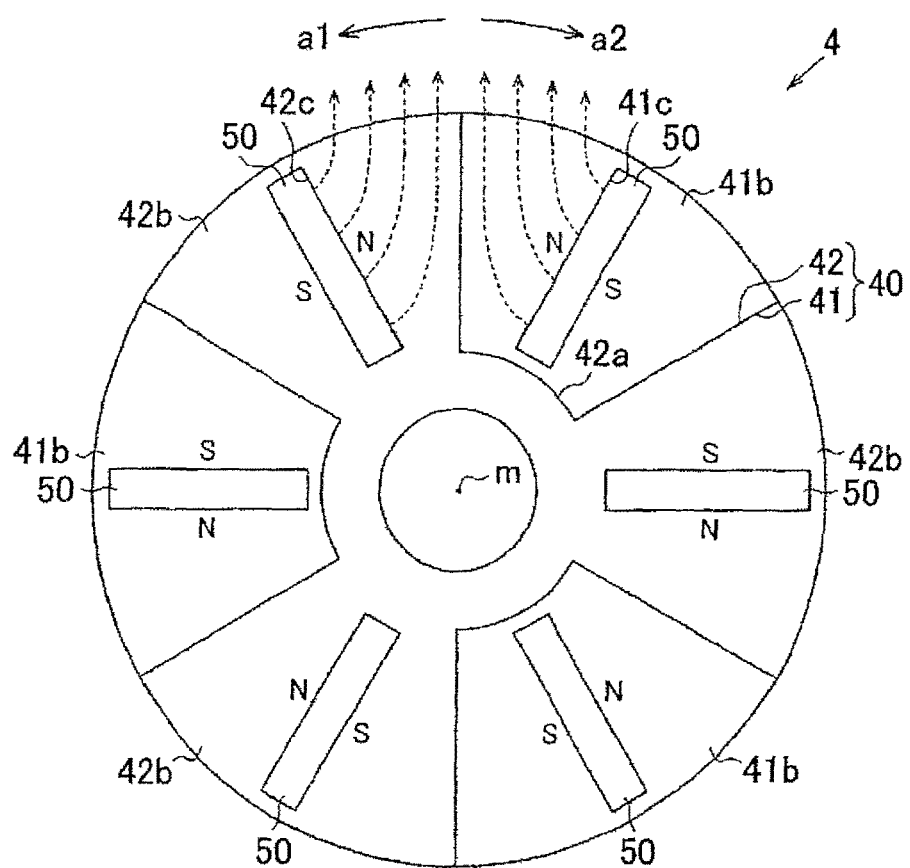
FIG. 9 is a plan view illustrating a planar structure of the magnet-embedded rotor according to the second embodiment.

The rotor 4 illustrated in FIG. 9 is formed by assembling the first core member 41 and the second core member 42 with the above-mentioned shapes. As illustrated in FIG. 9, in the rotor 4, the permanent magnets 50 are arranged radially, and the permanent magnet 50 disposed in the first core member 41 and the permanent magnet 50 disposed in the second core member 42 are arranged to face each other so that magnetic poles having the same polarity face each other. An N pole is formed at the outer peripheral part of the rotor core 40 by a part where the N poles of the permanent magnets 50 face each other, and an S pole is formed at the outer peripheral part of the rotor core 40 by a part where the S poles of the permanent magnets 50 face each other. In this manner, the rotor 4 has a six-pole structure in which the N poles and S poles are alternately disposed along the circumferential direction at the outer peripheral part.

Figure 10:
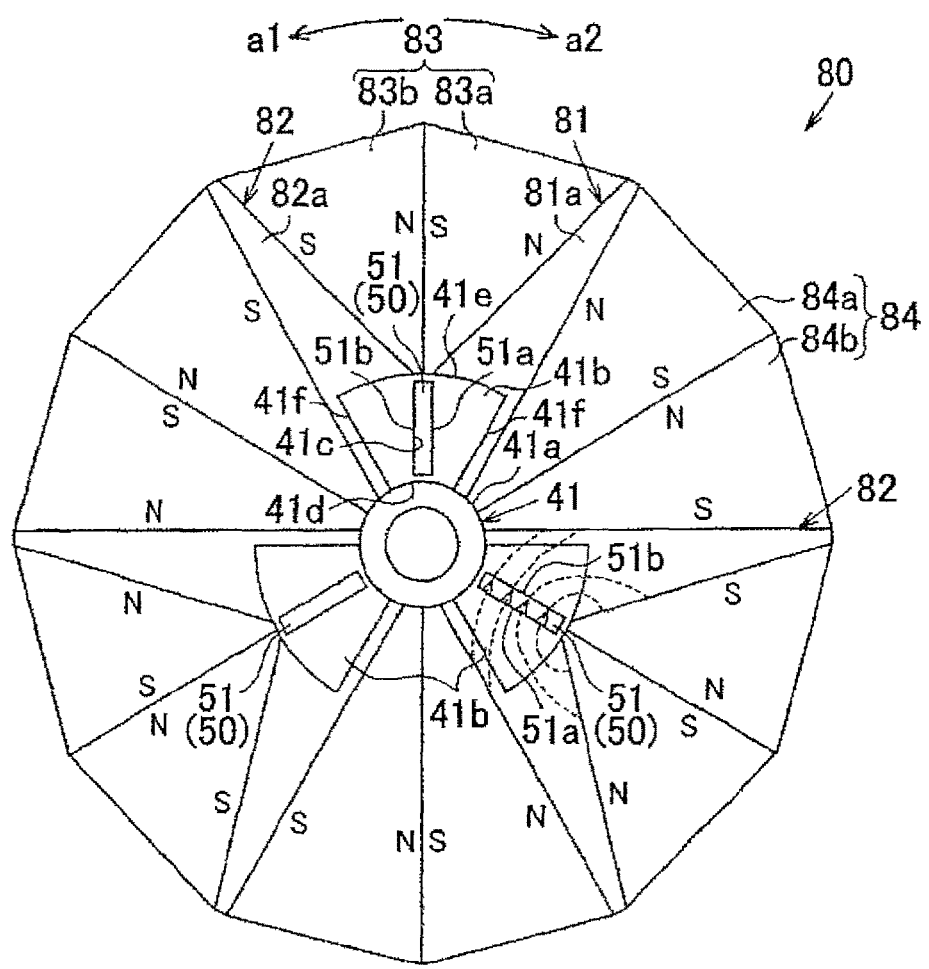
FIG. 10 is a plan view illustrating a method for magnetizing a core member of the magnet-embedded rotor according to the second embodiment.

Next, a method for manufacturing the rotor 4 illustrated in FIGS. 8 and 9 will be described. As in the first embodiment, the first core member 41 illustrated in FIG. 8 is formed by stacking magnetic steel sheets first, for manufacturing the rotor 4. Then, a magnet material prior to magnetization is embedded by injection molding or the like in the magnet insertion hole 41c of the formed first core member 41, and then orientation and magnetization are performed on the magnet material 51 by using an orientation and magnetization device 80 illustrated in FIG. 10. In FIG. 10, one side surface of the magnet material 51 in the tubular portion circumferential direction is indicated by reference numeral 51a, and the other side surface is indicated by reference numeral 51b.

As illustrated in FIG. 10, the orientation and magnetization device 80 includes a pair of first magnetizing yoke 81 and a second magnetizing yoke 82 that are arranged such that each projecting portion 41b is sandwiched between the first magnetizing yoke 81 and the second magnetizing yoke 82 in the tubular portion circumferential direction, and a first permanent magnet 83 and a second permanent magnet 84 that are arranged to fill a gap between the first magnetizing yoke 81 and the second magnetizing yoke 82.

The first magnetizing yoke 81 is formed to cover the one circumferential direction side surface 41f of the projecting portion 41b, which faces the one side surface 51a of the magnet material 51 and an area of the outer peripheral side surface 41e of the projecting portion 41b, which faces the one side surface 51a of the magnet material 51. The second magnetizing yoke 82 is formed to cover the other circumferential direction side surface 41f of the projecting portion 41*b*, which faces the other side surface 51*b* of the magnet material 51, and an area of the outer peripheral side surface 41*e* of the projecting portion 41*b*, which faces the other side surface 51*b* of the magnet material 51. In addition, the first magnetizing yoke 81 and the second magnetizing yoke 82 respectively have extending portions 81*a*, 82*a* that extend to the tubular portion radial direction outer side from parts facing the outer peripheral side surface 41*e* of the projecting portion 41*b*. The extending portions 81*a*, 82*a* are formed to be sharpened toward the tubular portion radial direction outer side.

The first permanent magnet 83 is arranged in an area outside the outer peripheral side surface 41*e* of the projecting portion 41*b* in a gap formed between the first magnetizing yoke 81 and the second magnetizing yoke 82 in the tubular portion circumferential direction. The first permanent magnet 83 includes a permanent magnet 83*a* that is adjacent to the first magnetizing yoke 81, and a permanent magnet 83*b* that is adjacent to the second magnetizing yoke 82. The permanent magnets 83*a*, 83*b* are adjacent to each other in the tubular portion circumferential direction. A part of the permanent magnet 83*a* that is adjacent to the first magnetizing yoke 81 is an N pole, and a part of the permanent magnet 83*a* that is adjacent to the permanent magnet 83*b* is an S pole. A part of the permanent magnet 83*b* that is adjacent to the second magnetizing yoke 82 is an S pole, and a part of the permanent magnet 83*b* that is adjacent to the permanent magnet 83*a* is an N pole.

The second permanent magnet 84 is arranged in an area between the projecting portions 41*b*, 41*b* that are adjacent to each other in the tubular portion circumferential direction in the gap formed between the first magnetizing yoke 81 and the second magnetizing yoke 82. The second permanent magnet 84 includes a permanent magnet 84*a* that is adjacent to the first magnetizing yoke 81, and a permanent magnet 84*b* that is adjacent to the second magnetizing yoke 82. The permanent magnets 84*a*, 84*b* are adjacent to each other in the tubular portion circumferential direction. A part of the one permanent magnet 84*a* that is adjacent to the first magnetizing yoke 81 is an N pole, and a part of the permanent magnet 84*a* that is adjacent to the other permanent magnet 84*b* is an S pole. A part of the other permanent magnet 84*b* that is adjacent to the second magnetizing yoke 82 is an S pole, and a part of the other permanent magnet 84*b* that is adjacent to the one permanent magnet 84*a* is an N pole.

According to the above configuration, the first permanent magnet 83 and the second permanent magnet 84 are arranged in such a manner that the N poles face each other across the first magnetizing yoke 81 and the S poles face each other across the second magnetizing yoke 82.

Magnetic paths that are indicated by dashed-line arrows in FIG. 10 are formed in the orientation and magnetization device 80. For convenience, only the magnetic paths that are formed by one of the projecting portions 41*b* are illustrated in FIG. 10. As illustrated in FIG. 10, the magnetic paths are formed so as to be directed from the one side surface 51*a* of the magnet material 51 to the other side surface 51*b*. Orientation is performed on the magnet material 51 in this manner, and the one side surface 51*a* of the magnet material 51 is magnetized to the S pole and the other side surface 51*b* is magnetized to the N pole. The magnet material 51 becomes the permanent magnet 50 through the magnetization process, and forming of the first core member 41 is completed. Since the second core member 42 has the same structure as the structure of the first core member 41, the second core member 42 can be formed by a method similar to the method in which the first core member 41 is formed. The manufacturing of the rotor 4 illustrated in FIGS. 8 and 9 is completed when the first core member 41 and the second core member 42 are assembled after the completion of the magnetization process.

According to the rotor 4, the method for manufacturing the rotor 4, and the orientation and magnetization device 80 described above, the following advantageous effects can be achieved in addition to an advantageous effect similar to the advantageous effect of the first embodiment described in the (1).

(4) Since the first core member 41 and the second core member 42 have the same structure, the first core member 41 and the second core member 42 can be manufactured by using the orientation and magnetization device 80 illustrated in FIG. 10. Accordingly, the manufacturing costs can be reduced.

(5) As illustrated by the dashed-line arrows in FIG. 9, the magnetic fields formed by the permanent magnets 50 repel each other between a set of the permanent magnets 50, 50 whose N poles face each other, and thus magnetic flux exchange does not occur therebetween. Accordingly, the magnetic flux that passes through a boundary part of the projecting portions 41*b*, 42*b* adjacent to each other in the circumferential direction of the rotor core 40 can be decreased. In addition, the same effect is achieved between a set of the permanent magnets 50, 50 whose S poles face each other. In this manner, the boundary part of the projecting portions 41*b*, 42*b* is unlikely to act as a magnetoresistance against the magnetic paths formed by the one set of permanent magnets 50, 50, and thus a reduction in magnetic flux density at the outer peripheral surface of the rotor core 40 can be suppressed. As a result, the output torque of the motor can be ensured.

Another Embodiment

Each of the embodiments above can be implemented as follows. The first magnetizing yoke 71 is adjacent to the circumferential direction side surface 41*f* of the projecting portion 41*b* in the orientation and magnetization device 70 according to the modification example of the first embodiment. However, the N pole of the permanent magnet may be directly adjacent to the circumferential direction side surface 41*f* of the projecting portion 41*b*. Similarly, the S pole of the permanent magnet may be directly adjacent to the outer peripheral side surface 41*e* of the projecting portion 41*b*. In this manner, the first magnetizing yoke 71 and the second magnetizing yoke 72 can be excluded. A similar configuration can be employed in the orientation and magnetization device 60 of the first embodiment and the orientation and magnetization device 80 of the second embodiment as well. In short, each of the orientation and magnetization devices 60, 70, 80 according to the respective embodiments may have a magnetic path forming unit that is arranged to face the outer peripheral side surface 41*e* and the circumferential direction side surface 41*f* of the projecting portion 41*b* such that the magnetic path is formed to extend through the magnet material prior to magnetization which is embedded in the projecting portion 41*b* by the magnetic path forming unit. However, when the magnetizing yoke is used, the magnetic flux generated from the permanent magnet can be collected and supplied to the magnet material prior to magnetization because saturation magnetization of a yoke is generally larger than saturation magnetization of a permanent magnet. Accordingly, it is preferable that the magnetizing yoke be used in view of the magnetization rate of the magnet material.

Either one of the first permanent magnet 83 and the second permanent magnet 84 may be omitted in the orientation and magnetization device 80 according to the second embodiment. Even in this configuration, the magnet material 51 can be magnetized.

Figure 11:
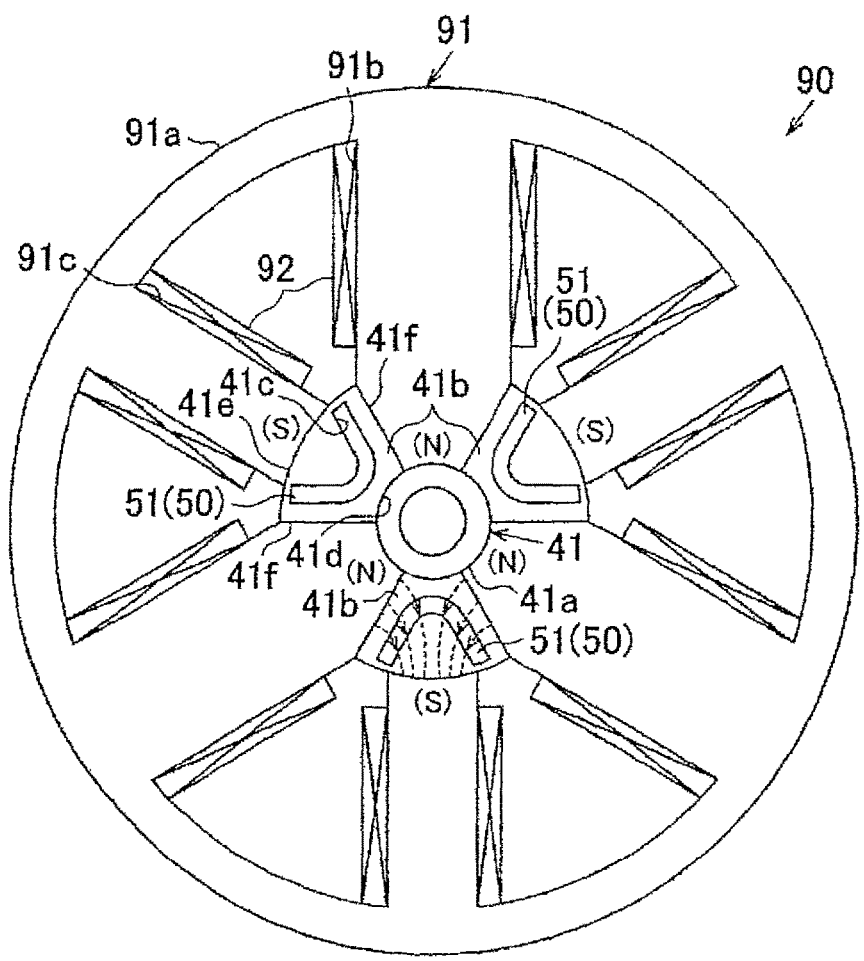
FIG. 11 is a plan view illustrating a method for magnetizing the core member of the magnet-embedded rotor according to the modification example of the first embodiment.

In each of the orientation and magnetization devices 60, 70, 80 shown in the respective embodiments described above, the permanent magnet is used as a magnetic flux generating unit for magnetization, but a magnetization coil may be used as well. FIG. 11 is a modification example of the orientation and magnetization device 70 illustrated in FIG. 7, and illustrates a structure of an orientation and magnetization device 90 in which the magnetization coil is used. As illustrated in FIG. 11, the orientation and magnetization device 90 includes a magnetizing yoke 91, and magnetization coils 92 that are wound around portions of the magnetizing yoke 91. The magnetizing yoke 91 includes an annular portion 91a that is arranged to surround the first core member 41, first extending portions 91b each of which is formed to extend from an inner wall surface of the annular portion 91a to the gap between the projecting portions 41b, 41b, and second extending portions 91c each of which is formed to extend from the inner wall surface of the annular portion 91a to the outer peripheral side surface 41e of the projecting portion 41b. The magnetization coil 92 is wound around each of the first extending portion 91b and the second extending portion 91c. An electric current is supplied to the magnetization coil 92 wound around the first extending portion 91b such that a part of the first extending portion 91b arranged between the projecting portions 41b, 41b is an N pole. An electric current is supplied to the magnetization coil 92 wound around the second extending portion 91c such that a part of the second extending portion 91c facing the outer peripheral side surface 41e of the projecting portion 41b is an S pole. In this manner, the magnetic paths illustrated by dashed lines in the drawing can be formed, and thus it is possible to achieve effects similar to the effects achieved in the orientation and magnetization device 70 shown in FIG. 7.

Figure 12:
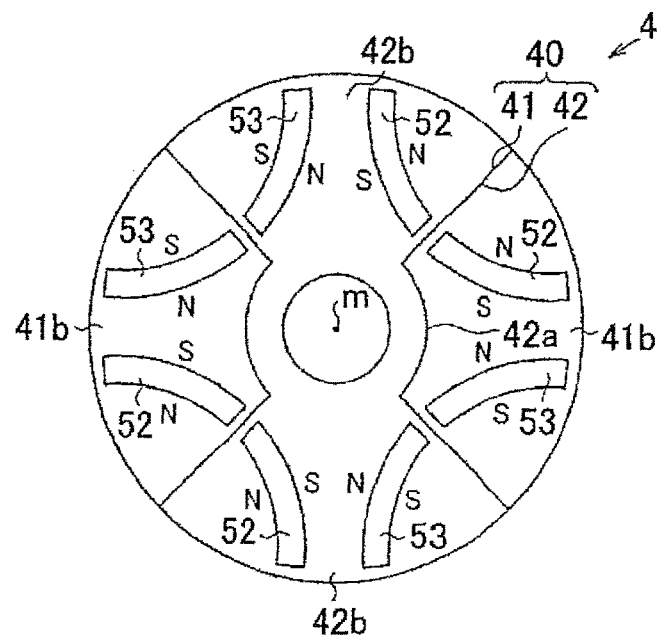
FIG. 12 is a plan view illustrating a planar structure of a magnet-embedded rotor according to another modification example.
Figure 13:
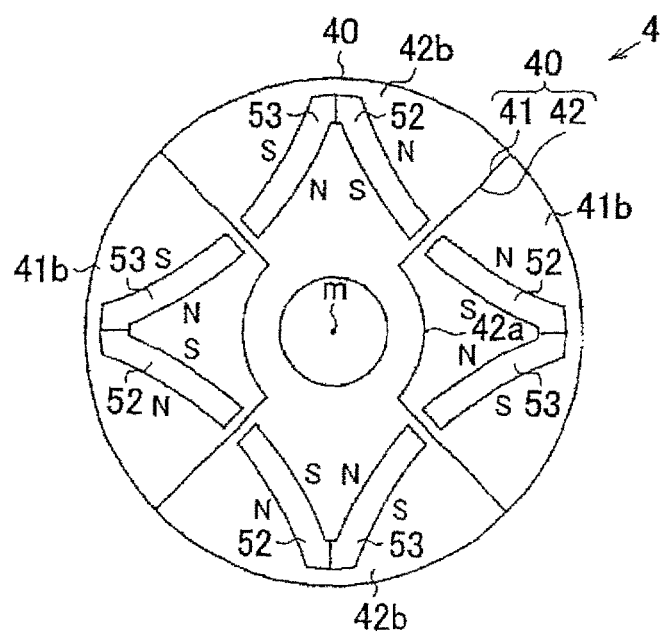
FIG. 13 is a plan view illustrating a planar structure of a magnet-embedded rotor according to another modification example.

The shape and arrangement of the permanent magnet embedded in each of the core members 41, 42 can be appropriately changed. For example, as illustrated in FIG. 12, paired permanent magnets 52, 53, which face each other so that magnetic poles with different polarities face each other in the rotor core circumferential direction, may be embedded in each of the projecting portions 41b, 42b of the core members 41, 42. The permanent magnet 52 that is embedded in the projecting portion 41b of the first core member 41 may be arranged to face the permanent magnet 52 embedded in the projecting portion 42b of the second core member 42 which is adjacent to the first core member 41 in the circumferential direction of the rotor core 40 so that the N poles face each other. In addition, the permanent magnet 53 that is embedded in the projecting portion 41b of the first core member 41 may be arranged to face the permanent magnet 53 embedded in the projecting portion 42b of the second core member 42 which is adjacent to the first core member 41 in the circumferential direction of the rotor core 40 so that the S poles face each other. The N pole may be formed at the outer peripheral part of the rotor core 40 by using a set of the permanent magnets 52, 52 which are adjacent in the rotor core circumferential direction, and the S pole may be formed at the outer peripheral part of the rotor core 40 by using a set of the permanent magnets 53, 53 which are adjacent in the rotor core circumferential direction. In addition, as illustrated in FIG. 13, rotor core radial direction outer side parts of the paired permanent magnets 52, 53 embedded in each of the projecting portions 41b, 42b may be connected with each other. Regarding the rotors 4 respectively illustrated in FIGS. 12 and 13, orientation and magnetization can be performed on the magnet material prior to magnetization by using the orientation and magnetization device 80 according to the second embodiment illustrated in FIG. 10.

Figure 14:
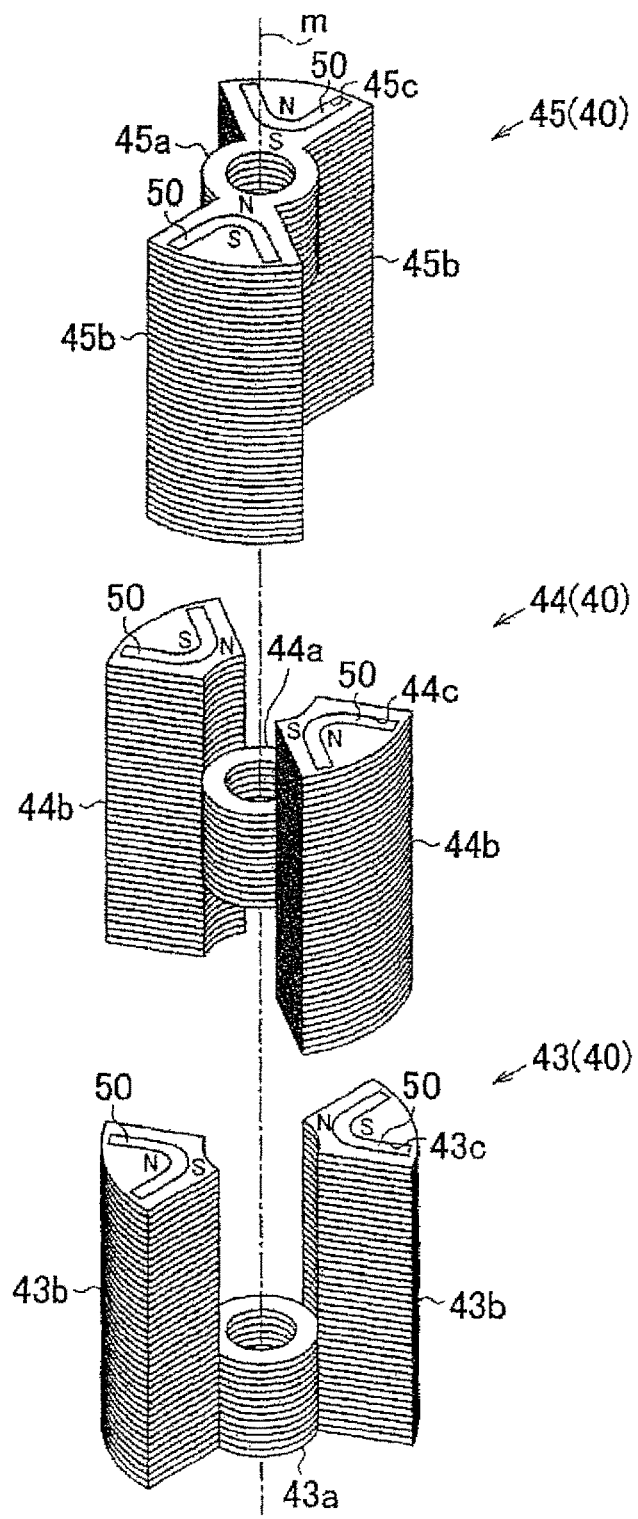
FIG. 14 is a perspective view illustrating an exploded perspective structure of a magnet-embedded rotor according to another modification example.

When the number of the projecting portions 41b, 42b of the respective core members 41, 42 is changed according to the number of the magnetic poles of the rotor 4, the number of the projecting portions 41b, 42b of the respective core members 41, 42 is increased as the number of the magnetic poles of the rotor 4 is increased. Accordingly, the gap between the projecting portions 41b, 41b of the first core member 41 and the gap between the projecting portions 42b, 42b of the second core member 42 are narrowed, and the arrangement of the magnetizing yoke becomes difficult. The number of the projecting portions of each of the core members may be decreased by setting the number of the core members constituting the rotor 4 to three or more. For example, in a case where the number of the magnetic poles of the rotor 4 is six, the rotor core 40 is configured to include three core members 43, 44, 45 as illustrated in FIG. 14. In FIG. 14, tubular portions of the core members 43, 44, 45 are respectively indicated by reference numerals 43a, 44a, 45a, projecting portions are respectively indicated by reference numerals 43b, 44b, 45b, and magnet insertion holes are respectively indicated by reference numerals 43c, 44c, 45c. According to the above configuration, the number of the projecting portions of each of the core members is decreased from three to two, and thus the gap between the projecting portions of each of the core members can be widened as compared to the rotor 4 illustrated in FIG. 6. Accordingly, the arrangement of the magnetizing yoke is facilitated.

The shape of the permanent magnet 50 is not limited to the shape in each of the embodiments. The cross-sectional shape of the permanent magnet 50 that is orthogonal to the tubular portion axial direction may be, for example, a V shape or an angular U shape. The bond magnet is used as the permanent magnet 50 in each of the embodiments, but a sintered magnet, a compression molding magnet, and the like may be used as well.

In each of the embodiments, the magnet material prior to magnetization is embedded in the magnet insertion holes 41c, 42c of the core members 41, 42 and then orientation and magnetization are performed on the magnet material by using the orientation and magnetization device 60, 70, or 80, but the present invention is not limited thereto. For example, orientation and magnetization may be performed on the magnet material during injection of the magnet material into the magnet insertion holes 41c, 42c of the core members 41, 42 in a state where the core members 41, 42 are arranged in the orientation and magnetization device 60, 70, or 80.

In each of the embodiments, the orientation and magnetization device that performs orientation and magnetization on the magnet material 51 has been described, but the device may perform only orientation or only magnetization on the magnet material 51. A material of the core members 41, 42 is not limited to the magnetic steel sheet. For example, a soft magnetic material such as an electromagnetic soft iron can be used as the material.

In each of the embodiments, the permanent magnets 73, 83, 84 may be configured to have one permanent magnet instead of being configured to include the paired permanent magnets 73*a*, 73*b*, 83*a*, 83*b*, 84*a*, 84*b*.

What is claimed is:

1. A magnet-embedded rotor comprising:
a cylindrical rotor core that rotates together with a rotating shaft, the cylindrical rotor core having a cylindrical surface extending around an entirety of an outer periphery of the cylindrical rotor core; and
permanent magnets embedded in the rotor core,
wherein the rotor core includes a plurality of core members, and each of the plurality of core members includes a tubular portion into which the rotating shaft is inserted and a plurality of projecting portions formed to project in a radial direction of the tubular portion from an outer periphery of the tubular portion and arranged apart from each other in a circumferential direction of the tubular portion,
wherein the rotor core is formed by assembling the plurality of core members such that the tubular portions of the plurality of core members are arranged on one straight line and an entire surface extending from a radially innermost position to a radially outermost position of each of the plurality of projecting portions of one of the plurality of core members contacts the corresponding entire surface extending from a radially innermost position to a radially outermost position of a corresponding projecting portion of another core member of the plurality of core members in a circumferential direction of the rotor core,
wherein each of the plurality of projecting portions includes an outer peripheral side surface and a circumferential direction side surface, the outer peripheral side surface constituting an outer peripheral part of the rotor core, and the circumferential direction side surface being in contact with the projecting portion of the other core member in the circumferential direction of the rotor core,
wherein a cross-sectional shape of each of the projecting portions that is orthogonal to an axial direction of the tubular portion is a substantially fan shape,
wherein the permanent magnet is embedded in each of the plurality of projecting portions of each of the plurality of core members,
wherein a length of each tubular portion in the axial direction of the rotor core is shorter than a length of each of the plurality of projecting portions in the axial direction of the rotor core, and a sum of the length of the tubular portions of the core members in the axial direction is equal to a length of each of the projecting portions in the axial direction, and
wherein each of the core members has a structure in which a plurality of magnetic steel sheets are stacked in an axial direction of the rotor core such that the core member is an integral body.

2. The magnet-embedded rotor according to claim 1, wherein the permanent magnet forming one magnetic pole at an outer peripheral part of the rotor core is embedded in each of the plurality of projecting portions.

3. The magnet-embedded rotor according to claim 1, wherein:
the permanent magnet embedded in the projecting portion of the core member is arranged to face the permanent magnet embedded in the projecting portion of the other core member adjacent to the core member in the circumferential direction of the rotor core so that magnetic poles having a same polarity face each other; and
one magnetic pole is formed at an outer peripheral part of the rotor core by a set of the permanent magnets that are arranged to face each other so that the magnet poles having the same polarity face each other.

4. The magnet-embedded rotor according to claim 1, wherein the number of the plurality of core members assembled to form the rotor core is three or more.

5. The magnet-embedded rotor according to claim 1, wherein the plurality of core members have a same shape except for a magnetic pole arrangement of each of the permanent magnets.

* * * * *